US009602332B2

(12) United States Patent
Shirota et al.

(10) Patent No.: US 9,602,332 B2
(45) Date of Patent: Mar. 21, 2017

(54) METHOD AND APPARATUS FOR DNS UPDATE TRIGGERED IPV6 NEIGHBOR ADVERTISEMENT

(75) Inventors: Masakazu Shirota, Kanagawa (JP); Jun Wang, La Jolla, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 12/131,801

(22) Filed: Jun. 2, 2008

(65) Prior Publication Data

US 2008/0310323 A1   Dec. 18, 2008

Related U.S. Application Data

(60) Provisional application No. 60/944,433, filed on Jun. 15, 2007, provisional application No. 60/951,664, filed on Jul. 24, 2007.

(51) Int. Cl.
*H04L 12/28* (2006.01)
*H04L 29/12* (2006.01)

(52) U.S. Cl.
CPC .... *H04L 29/12056* (2013.01); *H04L 29/1232* (2013.01); *H04L 29/12301* (2013.01);
(Continued)

(58) Field of Classification Search
USPC ........................................ 370/254, 238, 328
See application file for complete search history.

(56) References Cited

U.S. PATENT DOCUMENTS 6,816,912 B1 * 11/2004 Borella et al. ................ 709/238
7,324,474 B2 * 1/2008 Shirota et al. ................ 370/328
(Continued)

FOREIGN PATENT DOCUMENTS

EP         1841183      10/2007
TW         I245997      12/2005
WO      WO2006066497    6/2006

OTHER PUBLICATIONS

DNS update in IPV6 stateless configuration by REnxiang Yan, Jan. 20, 2005.*
(Continued)

*Primary Examiner* — Man Phan
*Assistant Examiner* — Pamit Kaur
(74) *Attorney, Agent, or Firm* — Francois Pelaez; Michael Taveira

(57) ABSTRACT

In a 3GPP2 Converged Access Network (CAN), IPv6 stateless auto configuration can be used to configure an IPv6 address of an access terminal (AT) for Simple IPv6 operation. A domain name system (DNS) update is triggered by IPv6 Neighbor Advertisement addresses a need for a DNS update when the full IPv6 address (128 bits) has not yet been sent in IPv6 packets from the AT. Upon receipt of the full address in response to the IPv6 Neighbor Advertisement, provision is made for prompting this DNS update even when the requesting network entity (e.g., access gateway (AGW) or home agent (HA)) does not have security authentication with a responsible home DNS server by utilizing access to an authentication, authorization, and accounting (AAA) function, perhaps via a local visited AAA, to submit an Accounting Request (Start) message that prompts the home DNS server to perform the DNS update.

38 Claims, 8 Drawing Sheets

(52) U.S. Cl.
CPC ...... *H04L 61/1505* (2013.01); *H04L 61/2076* (2013.01); *H04L 61/2092* (2013.01)

(56) References Cited

U.S. PATENT DOCUMENTS

| | | | |
|---|---|---|---|
| 2003/0026230 A1* | 2/2003 | Ibanez et al. | 370/338 |
| 2003/0091013 A1* | 5/2003 | Song et al. | 370/338 |
| 2007/0097921 A1* | 5/2007 | Choi et al. | 370/331 |
| 2007/0274250 A1* | 11/2007 | Chen et al. | 370/328 |
| 2010/0316019 A1* | 12/2010 | Liu et al. | 370/331 |

OTHER PUBLICATIONS

Chapter 5, "ICMPv6", Dec. 97.*
Introduction to IP version 6, Feb. 2002.*
Giaretta G et al: "Mobile IPV6 bootstrapping in split scenario; draft-ietf-mip6-bootstrapping-split-05.txt" IETF Standard-Working-Draftm Internet Engineering Task Force, IETF, CH, vol. Mip6, No. 5, May 25, 2007, XP015049556.
International Search Report and Written Opinion—PCT/US2008/066795, International Search Authority—European Patent Office—Nov. 14, 2008.
Thomson, et al., "IPv6 Stateless Address Autoconfiguration", FRC 2462 Dec. 1998 XP150008246, pp. 1-26.
Taiwan Search Report—TW097122271—TIPO—Apr. 10, 2012.
Yan R., et al., "DNS update in IPv6 stateless conifguration" <draft-yan-ipv6-ra-dns-01.txt>, IETF Internet Draft, Jun. 25, 2005.

* cited by examiner

METHOD AND APPARATUS FOR DNS UPDATE TRIGGERED IPV6 NEIGHBOR ADVERTISEMENT

CLAIM OF PRIORITY UNDER 35 U.S.C. §119

The present Application for Patent claims priority to U.S. patent application Ser. No. 60/944,433, entitled "DNS UPDATE TRIGGERED BY IPv6 NEIGHBOR ADVERTISEMENT" filed 15 Jun. 2007, assigned to the assignee hereof and hereby expressly incorporated by reference herein. The present Application for Patent also claims priority to U.S. patent application Ser. No. 60/951,664, entitled "DNS UPDATE FOR 3GPP2 CONVERGED ACCESS NETWORK" filed 24 Jul. 2007, assigned to the assignee hereof and hereby expressly incorporated by reference herein.

FIELD OF INVENTION

The present disclosure pertains to data packet communication systems, and in particular to such systems that support stateless address autoconfiguration.

BACKGROUND

Internet Protocol version 6 (IPv6) is a network layer protocol for packet-switched internetworks. It is designated as the successor of IPv4, the current version of the Internet Protocol, for general use on the Internet. The main change brought by IPv6 is a much larger address space that allows greater flexibility in assigning addresses. In particular, the IPv6 uses a 128-bit address that is divided into a prefix (most significant bits) and an interface identifier. In theory those two fields may vary in length. However, it is understood in practice that the prefix advertised to a host is typically 64 bits. The extended address length eliminates the need to use network address translation to avoid address exhaustion, and also simplifies aspects of address assignment and renumbering when changing providers. It was not the intention of IPv6 designers, however, to give permanent unique addresses to every individual and every computer.

The large number of addresses allows a hierarchical allocation of addresses that may make routing and renumbering simpler. With IPv4, complex classless inter-domain routing (CIDR) techniques were developed to make the best possible use of a restricted address space. Renumbering, when changing providers, can be a major effort with IPv4. With IPv6, however, renumbering becomes largely automatic, because the host identifiers are decoupled from the network provider identifier. Separate address spaces exist for Internet Service Providers (ISPs) and for hosts, which are "inefficient" in address space bits but are extremely efficient for operational issues such as changing service providers.

It is understood that there may be two defined mechanisms for allocating addresses in IPv6, including: (1) stateless address autoconfiguration and (2) stateful address autoconfiguration. In the stateless mechanism, a router can advertise a prefix for the link and each host on the link forms a unique interface identifier. Since the prefix is unique, appending a unique interface identifier can guarantee the uniqueness of the address. The interface identifier (IID) may therefore only need to be unique within a link since the prefix is globally unique.

Stateless address autoconfiguration exploits several other new features in IPv6, including link-local addresses, multicasting, the Neighbor Discovery (ND) protocol, and the ability to generate the interface identifier of an address from the underlying data link layer address. The general idea is to have a device generate a temporary address until it can determine the characteristics of the network it is on, and then create a permanent address that it can use based on that information.

The process can be summarized by the following:
(1) The device generates a link-local address using the prefix;
(2) The node tests to ensure that the address was generated is not already in use on the local network;
(3) Assuming the uniqueness test passes, the device assigns the link-local address to its IP interface for communication on the local network, but not on the wider Internet;
(4) The node next attempts to contact a local router for more information on continuing the configuration. This is done either by listening for Router Advertisement messages sent periodically by routers, or by sending a specific Router Solicitation to ask a router for information using the IPv6 Neighbor Discovery protocol; and
(5) The router provides direction to the node on how to proceed with the auto configuration.

While this IPv6 stateless autoconfiguration has a number of advantages, a problem arises when the network wants to perform an update of the domain name system (DNS) or when a home AAA (authentication, authorization, and accounting) requires a full IPv6 address in a Usage Date Record (UDR). The access terminal may not be timely in completing the stateless autoconfiguration to support these actions.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with coordinating with user equipment in conjunction with a supporting stateless address autoconfiguration by sending an IPv6 prefix upon receipt of a router solicitation from an access terminal. When a need arises for a DNS update and the AT has not yet advertised a full IPv6 address generated with the IPv6 prefix, a neighbor solicitation is made to the AT to elicit a neighbor advertisement. Whether the neighbor advertisement is received solicited or unsolicited, the DNS update can be achieved even when the requesting entity (e.g., access gateway, home agent) does not have a secure authorization with a DNS server that performs the DNS update. In particular, having access to an authentication, authorization, and accounting (AAA) function enables prompting the DNS update with an accounting request-start message.

In one aspect, a method is provided for performing a dynamic name system (DNS) update on a data packet network. A router solicitation is received from an access terminal (AT) for performing stateless address autoconfiguration. An Internet Protocol version 6 (IPv6) prefix is sent to the AT followed by a neighbor solicitation. A neighbor advertisement is received from the AT containing an IPv6 address. A network action is then initiated to cause a DNS update.

In another aspect, at least one processor performs a dynamic name system (DNS) update on a data packet network. A first module receives a router solicitation from an access terminal (AT) for performing stateless address autoconfiguration. A second module sends an Internet Protocol version 6 (IPv6) prefix to the AT followed by a neighbor solicitation. A third module receives a neighbor advertisement from the AT containing an IPv6 address. A fourth module initiates a network action to cause a DNS update.

In an additional aspect, a computer program method performs a dynamic name system (DNS) update on a data packet network by having a computer readable medium with sets of codes for causing a computer to perform the following: (a) to receive a router solicitation from an access terminal (AT) for performing stateless address autoconfiguration; (b) to send an Internet Protocol version 6 (IPv6) prefix to the AT followed by a neighbor solicitation; (c) to receive a neighbor advertisement from the AT containing an IPv6 address; and (d) to initiate a network action to cause a DNS update.

In another additional aspect, an apparatus performs a dynamic name system (DNS) update on a data packet network. Means are provided for receiving a router solicitation from an access terminal (AT) for performing stateless address autoconfiguration. Means are provided for sending an Internet Protocol version 6 (IPv6) prefix to the AT followed by a neighbor solicitation. Means are provided for receiving a neighbor advertisement from the AT containing an IPv6 address. Means are provided for initiating a network action to cause a DNS update.

In a further aspect, an apparatus performs a dynamic name system (DNS) update on a data packet network. A data packet communication network receives a router solicitation from an access terminal (AT) for performing stateless address autoconfiguration. An access gateway (AGW) sends an Internet Protocol version 6 (IPv6) prefix to the AT followed by a neighbor solicitation and receives a neighbor advertisement from the AT containing an IPv6 address. A network entity associated with the access gateway (AGW) initiates a network action to cause a DNS update.

In yet one other aspect, a method is provided for performing a dynamic name system (DNS) update on a data packet network. A router solicitation is sent to an access gateway (AGW). An Internet Protocol version 6 (IPv6) prefix followed by a neighbor solicitation is received from the AGW. Stateless address autoconfiguration is performed using the IPv6 prefix. A neighbor advertisement is sent to the AGW containing an IPv6 address. A network action is initiated to cause a DNS update by sending a DNS update message to the AGW.

In yet another aspect, at least one processor performs a dynamic name system (DNS) update on a data packet network. A first module sends a router solicitation to an access gateway (AGW). A second module receives an Internet Protocol version 6 (IPv6) prefix followed by a neighbor solicitation from the AGW. A third module performs stateless address autoconfiguration using the IPv6 prefix. A fourth module sends a neighbor advertisement containing an IPv6 address to the AGW. A fifth module initiates a network action to cause a DNS update by sending a DNS update message to the AGW.

In yet an additional aspect, a computer program method performs a dynamic name system (DNS) update on a data packet network by having a computer readable medium with set of codes. A first set of codes causes a computer to send a router solicitation to an access gateway (AGW). A second set of codes causes the computer to receive an Internet Protocol version 6 (IPv6) prefix followed by a neighbor solicitation from the AGW. A third set of codes causes the computer to perform stateless address autoconfiguration using the IPv6 prefix. A fourth set of codes causes the computer to send a neighbor advertisement containing an IPv6 address to the AGW. A fifth set of codes causes the computer to initiate a network action to cause a DNS update by sending a DNS update message to the AGW.

In yet another additional aspect, an apparatus performs a dynamic name system (DNS) update on a data packet network. Means are provided for sending a router solicitation to an access gateway (AGW). Means are provided for receiving an Internet Protocol version 6 (IPv6) prefix followed by a neighbor solicitation from the AGW. Means are provided for performing stateless address autoconfiguration using the IPv6 prefix. Means are provided for sending a neighbor advertisement containing an IPv6 address to the AGW. Means are provided for initiating a network action to cause a DNS update by sending a DNS update message to the AGW.

In yet a further aspect, an apparatus performs a dynamic name system (DNS) update on a data packet network. A transmitter component sends a router solicitation to an access gateway (AGW). A receiver component receives an Internet Protocol version 6 (IPv6) prefix followed by a neighbor solicitation from the AGW. An address autoconfiguration component performs stateless address autoconfiguration using the IPv6 prefix and causes the transmitter component to send a neighbor advertisement containing an IPv6 address to the AGW and to initiate a network action to cause a DNS update by sending a DNS update message to the AGW.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In a 3GPP2 Converged Access Network (CAN), IPv6 stateless auto configuration can be used to configure an IPv6 address of an access terminal (AT) for Simple IPv6 operation. A domain name system (DNS) update triggered by IPv6 Neighbor Advertisement addresses a need for a DNS update when the full IPv6 address (128 bits) has not yet been sent in IPv6 packets from the AT. Upon receipt of the full address in response to the IPv6 Neighbor Advertisement, provision is made for prompting this DNS update even when the requesting network entity (e.g., access gateway (AGW) or home agent (HA)) does not have security authentication with a responsible home DNS server by utilizing access to an authentication, authorization, and accounting (AAA) function, perhaps via a local visited AAA, to submit an Accounting Request (Start) message that prompts the home DNS server to perform the DNS update.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
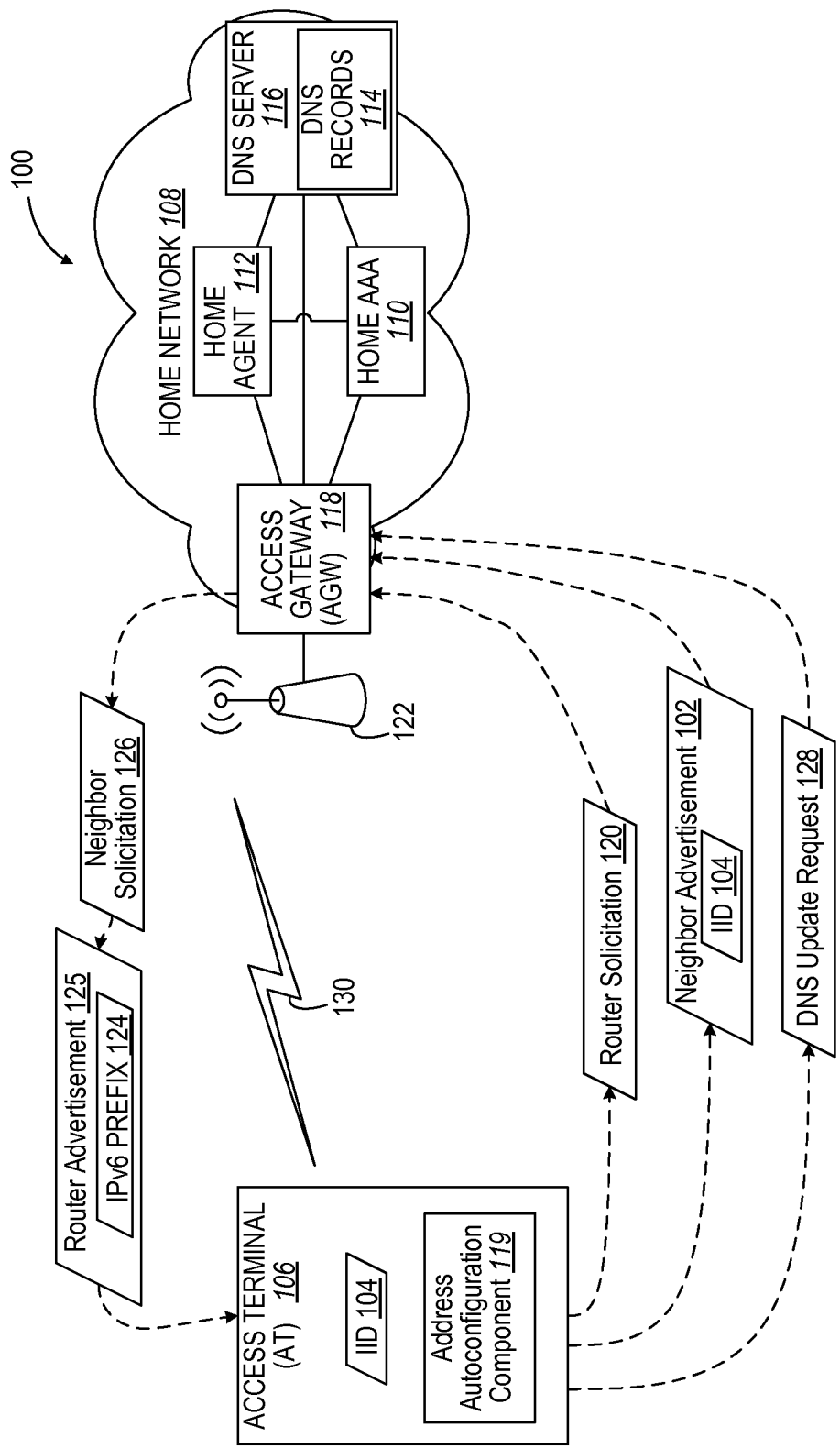
FIG. 1 illustrates an IPv6 converged access network (CAN) performing a stateless address autoconfiguration.

Turning to the Drawings, in FIG. 1, a data packet network 100, which in an illustrative aspect is a 3GPP2 Converged Access Network (CAN), is triggered by an IPv6 Neighbor Advertisement 102 that contains an interface identifier (IID) 104 of an IPv6 address created by an access terminal (AT) 106 using stateless address autoconfiguration. Authorized clients of a home network or domain 108, such as a home AAA (HAAA) 110 or home agent (HA) 112, can update DNS resource records 114 to keep a DNS server 116 updated. When the HAAA 110 performs the DNS update, a reception of the RADIUS Accounting Request (Start) message at the HAAA 110 is used for the trigger of sending DNS update to the DNS server 116. When the HA 112 performs the DNS update, upon completion of authentication with the HAAA 110, the HA sends the DNS update to the DNS server 116. Instead of the HA 112, an access gateway (AGW) 118 can also signal the HAAA 110 or, if authenticated, directly to the DNS server 116.

In the case of the AT 106 undergoing a stateless address autoconfiguration utilizing an address autoconfiguration component 119, a router solicitation 120 is sent from the AT 106 to an evolved base station (eBS) 122 and in turn to the AGW 118, which responds with a 128-bit IPv6 prefix 124 in a router advertisement 125 and advantageously responds with a neighbor solicitation 126 in order to expeditiously learn the IID 104 of the solicited neighbor advertisement 102. The AT 106 can subsequently initiate the DNS update with the address autoconfiguration component 119 that generates a DNS update request 128 to the AGW 118. A communication channel 130 between the AT 106 and eBS 122 in an exemplary aspect is a wireless data packet communication channel, although aspects herein have application to wired communication channels.

Thus, it should be appreciated with the benefit of the foregoing that the network 100 thus addresses in one aspect a situation in which the IPv6 stateless auto configuration is used to configure the IPv6 address of the AT 106 for the Simple IPv6 operation. When the AGW 118 receives the Router Solicitation message 120 from the AT 106, the AGW 118 gives the Prefix in the Router Advertisement to the AT. Then, the AT 106 configures its IPv6 address with IID 104 generated by the AT 106. Thus, the network does not know the full IPv6 address (128 bits) of the AT 106 until it receives some IPv6 packets from the AT 106. This becomes an issue when the network 100 needs to perform the DNS update. When the DNS update is performed, a full IPv6 address is required.

Figure 2:
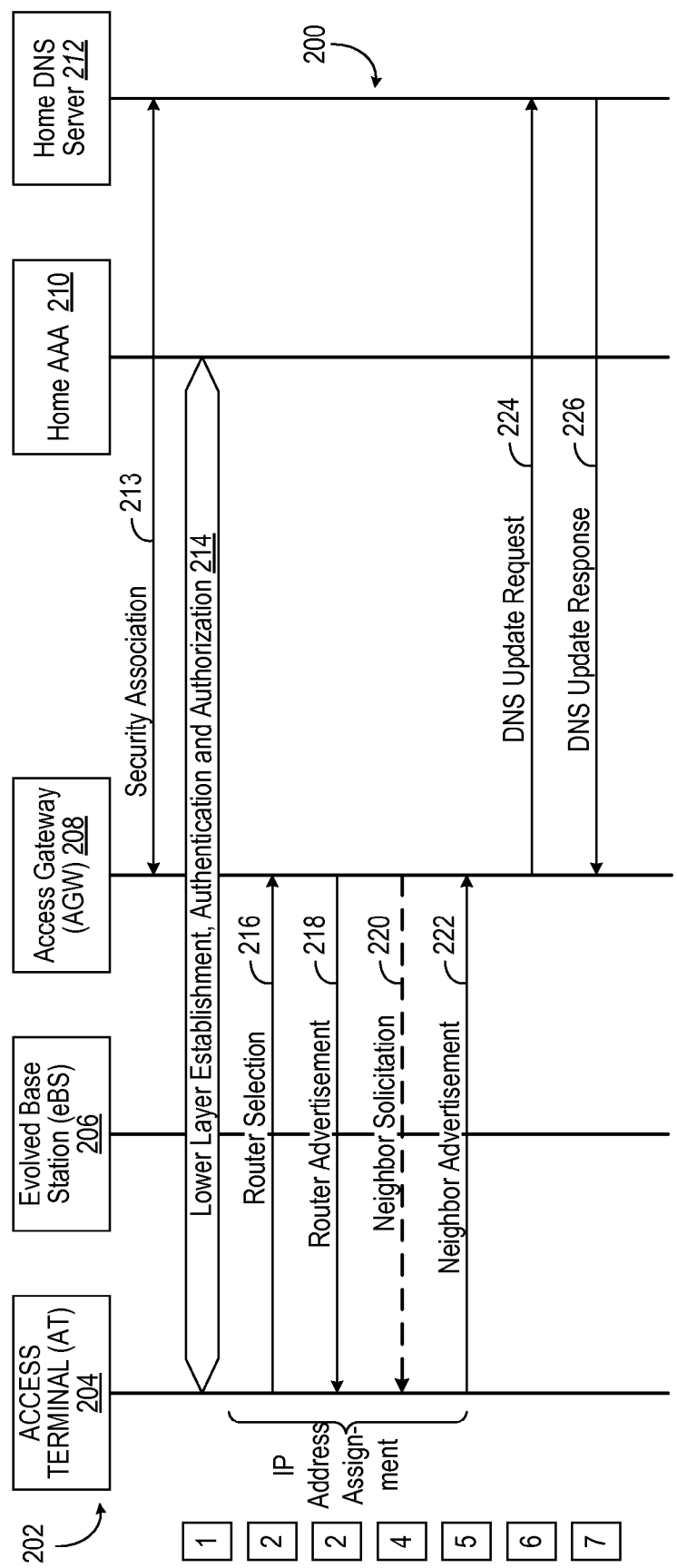
FIG. 2 illustrates a timing diagram for a methodology for dynamic name system (DNS) update on a data packet network utilizing a neighbor solicitation in conjunction with stateless address autoconfiguration in order to directly prompt a DNS server to perform a DNS update.
Figure 3:
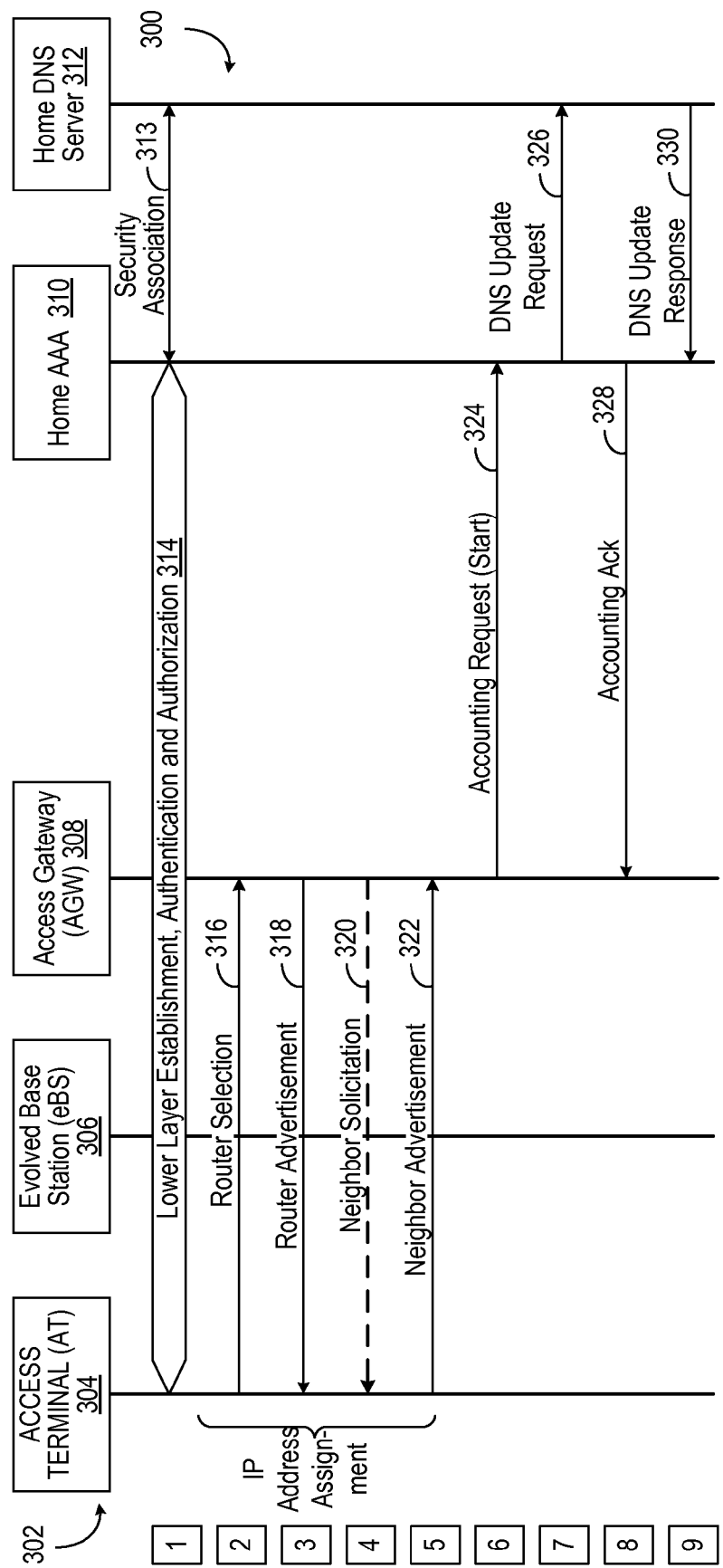
FIG. 3 illustrates a timing diagram for a methodology for DNS update on a packet network utilizing an accounting request (start) message to an authentication, authorization, and accounting (AAA) function to indirectly prompt a DNS server to perform a DNS update.
Figure 5:
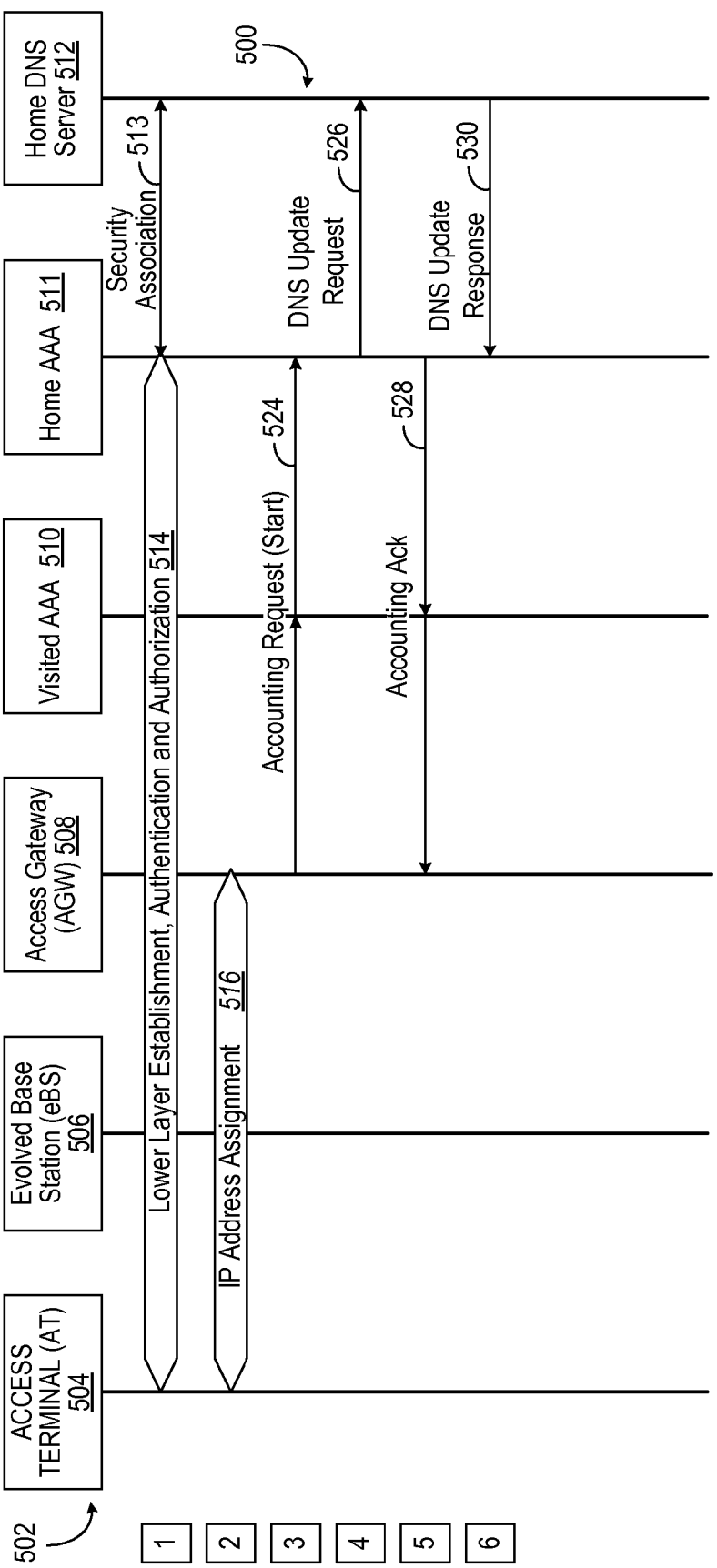
FIG. 5 illustrates a timing diagram for a methodology for DNS update on a data packet network having a visited domain and a home domain.

FIGS. 2, 3 and 5 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 2, an exemplary DNS update methodology 200 triggered by IPv6 Neighbor advertisement is described hereafter. A data packet network 202 is formed between an access terminal (AT) 204, an evolved base station (eBS) 206, an access gateway (AGW) 208, a home authentication authorization accounting server (HAAA) 210 and a home DNS server 212. A security association 213 exists between network entities (e.g., AGW 208, home agent (HA) (not shown)) and the home DNS server 212 for directly requesting a DNS update.

Lower layer establishment, authentication and authorization are performed at step (1) depicted as block 214, among the AT 204, the eBS 206, the AGW 208 and the HAAA 210. At step (2), depicted at 216, the AT 204 sends the Router Solicitation to the Access Gateway (AGW) 208. At step (3) depicted at 218, the AGW 208 sends the Router Advertisement with the prefix for the link to the AT 204. At step (4) depicted at 220, the AGW 208 can advantageously send the Neighbor Solicitation to the AT 204. At step (5) depicted at block 222, after the AT 204 receives the Router Advertisement, the AT 204 configures its IPv6 address with IID that is locally generated at the AT 204. The AT 204 sends the Neighbor Advertisement to AGW 208 to indicate its full IPv6 address, completing IPv6 address assignment. At step (6) depicted at block 224, when the AGW 208 receives the Neighbor Advertisement, which can originate from a mobile subscriber (MS) (not shown) utilizing the AT 204, the AGW 208 knows the full IPv6 address of the AT 204. Then, the AGW 208 sends the DNS Update Request to the DNS Server 212. At step (7) depicted at block 226, the DNS server 212 sends the DNS Update Response.

Referring now to FIG. 3, an exemplary DNS update methodology 300 triggered by IPv6 Neighbor advertisement is described hereafter. A data packet network 302 is formed between an access terminal (AT) 304, an evolved base station (eBS) 306, an access gateway (AGW) 308, a home authentication authorization accounting server (HAAA) 310 and a home DNS server 312. A security association does not exist between network entities (e.g., AGW 308, home agent (HA) (not shown)) and the home DNS server 312 for directly requesting a DNS update. However, a security association 313 does exist between the HAAA 310 and the DNS server 312.

Similarly to the afore-mentioned, stateless address auto-configuration is performed. Lower layer establishment, authentication and authorization are performed at step (1) depicted as block 314, among the AT 304, the eBS 306, the AGW 308 and the HAAA 310. At step (2), depicted at 316, the AT 304 sends the Router Solicitation to the Access Gateway (AGW) 308. At step (3) depicted at 318, the AGW 308 sends the Router Advertisement with the prefix for the link to the AT 304. At step (4) depicted at 320, the AGW 308 can advantageously send the Neighbor Solicitation to the AT 304. At step (5) depicted at block 322, after the AT 304 receives the Router Advertisement, the AT 304 configures its IPv6 address with IID that is locally generated at the AT 304. The AT 304 sends the Neighbor Advertisement to AGW 308 to indicate its full IPv6 address, completing IPv6 address assignment.

As mentioned above, the DNS server 312 does not have a security association with the AGW 308. At step (6) as depicted at 324, instead of sending a DNS update, the AGW 308 sends the Accounting Request (Start) message to the HAAA 310. At step (7) depicted at 326, the HAAA 310 configures the DNS update request message from the information in the Accounting Request (Start) message and sends to the DNS server 312. At step (8) depicted at 328, the HAAA 310 sends an accounting acknowledgement (Ack) to the AGW 308. At step (9) depicted at 330, the DNS server 312 provides a DNS update response to the HAAA 310.

Figure 4:
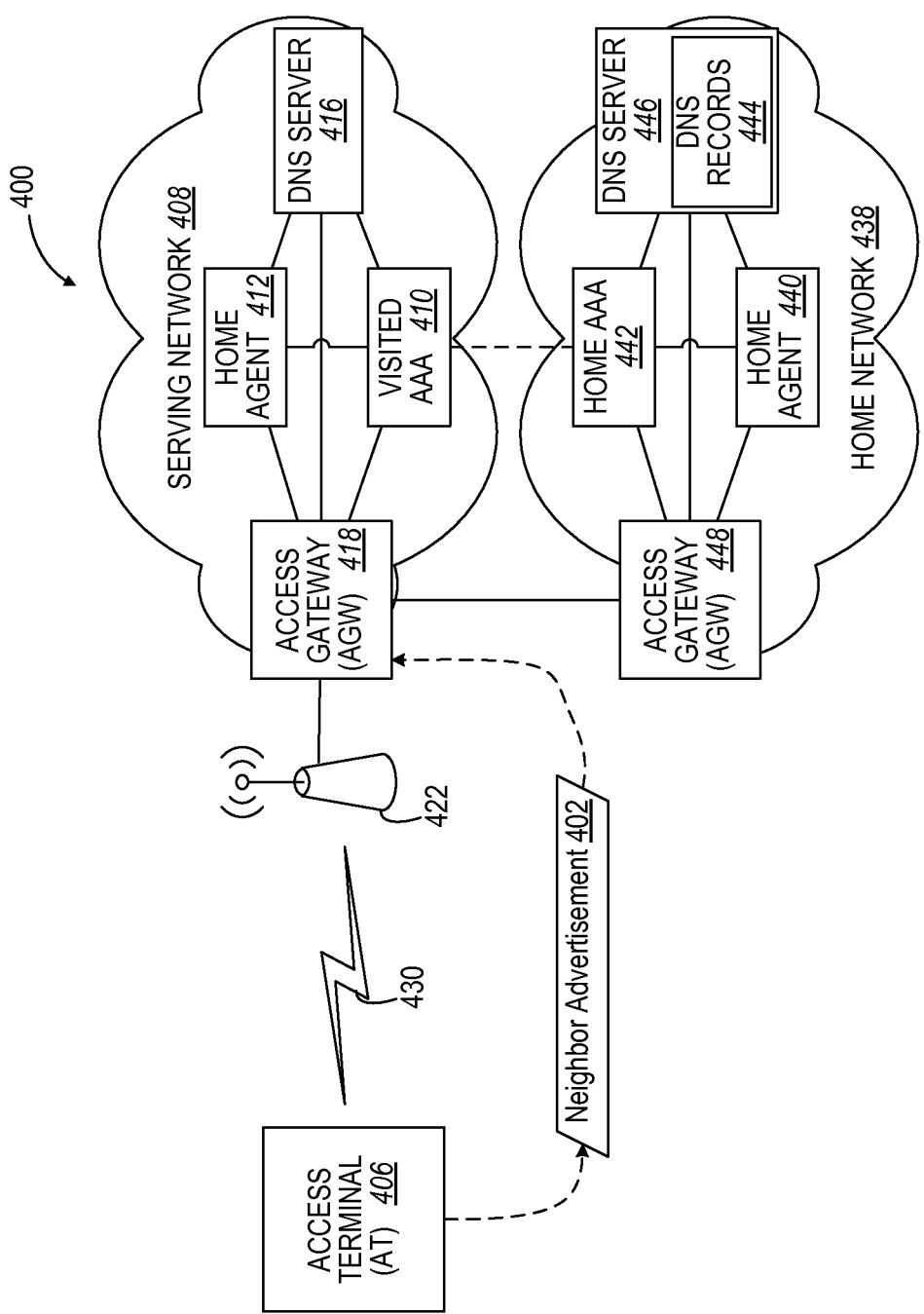
FIG. 4 illustrates a block diagram of a CAN having a visited domain and a home domain with indirect prompting of a home DNS server to perform a DNS update having a network entity (e.g., access gateway (AGW), home agent) sent an accounting request (start) message to a home AAA via a visited AAA.

In FIG. 4, a data packet network 400 addresses an issue regarding such lack of security association when an IPv6 Neighbor Advertisement 402, either solicited or unsolicited, is sent from an access terminal (AT) 406 to a serving (visited) network or domain 408. Authorized clients of the serving network 408, such as a visited AAA (VAAA) 410 or home agent (HA) 412, are associated with a DNS server 416 that does not contain the DNS records for the AT 406. An access gateway (AGW) 418 of the serving network 408 communicates via an evolved base station (eBS) 422 over a communication channel 430 with the AT 406.

A home network 438 has a home AAA (HAAA) 440, which has an association with the VAAA 410 of the visited network 408, and a home agent 442. The HAAA 440 is capable of causing the updating of DNS resource records 444 about the AT 406 that are on a home DNS server 446. The home network 438 has an access gateway (AGW) 458 that is in communication with the AGW 418 of the visited network 408.

Consider that when dynamic home agent (HA) assignment is performed, the HA 412 could be located in the serving (visited) network or domain 408. The AGW 418 is always located in the serving network 408. On the other hand, the DNS server 446 that stores particular user's resource record 444 is typically located in the home network 438. If one wants to have the HA (Home Agent for Mobile IP) 412 or the AGW 418 perform the DNS update, the HA 412 or the AGW 418 in the serving network 408 must have the security association with the DNS server 446 in the home network 438, which is technically possible but does not scale well to be a desirable solution.

To address this issue, the HA 412 or the AGW 418 includes the DNS update request in the AAA protocol (e.g., Diameter or RADIUS) and sends it to the HAAA 440 via VAAA 410, thereby avoiding the need for a security association between one of the AGW 418 and the HA 412 and the home DNS server 446. Instead of having direct security association, the AGW 418 or HA 412 relies on the security association established for AAA protocol.

Referring now to FIG. 5, a methodology 500 for DNS update using AAA protocol is depicted for a network 502 formed between an access terminal (AT) 504, an evolved base station (eBS) 506, an access gateway (AGW) 508, a visitor authentication authorization accounting server (VAAA) 510, a HAAA 511 and a home DNS server 512. A security association does not exist between network entities (e.g., AGW 508, home agent (HA) (not shown)) and the home DNS server 512 for directly requesting a DNS update. However, a security association 513 does reside between HAAA 511 and home DNS server 512.

Lower layer establishment, authentication and authorization are performed at step (1) depicted at 514 among the Access Terminal (AT) 504, the eBS 506, the AGW 508 and the HAAA 511 via the VAAA 510. At step (2) depicted at 516, IP Address Assignment is performed via either Mobile IPv4, Mobile IPv6, Simple IPv4, or Simple IPv6. At step (3) depicted at 524, after the IP address is assigned, the AGW 508 or the HA (not shown) in the serving network includes the DNS Update Request in a RADIUS attribute or Diameter AVP and sends it along with an AAA protocol message. This message is sent to the HAAA 511 via VAAA 510. At step (4) depicted at 526, when the HAAA 511 receives an AAA protocol message containing the DNS update request from the VAAA 510, the HAAA 511 sends its DNS update request to the DNS server 512. At step (5) depicted at 528, the HAAA 511 sends an AAA Protocol Acknowledgement back to the serving network via the VAAA 510. At step (6) depicted at 530, the DNS server 512 sends the DNS update response to the HAAA 511. It is to be noted that steps (5) and (6) can be performed in parallel or inverse order.

Figure 6:
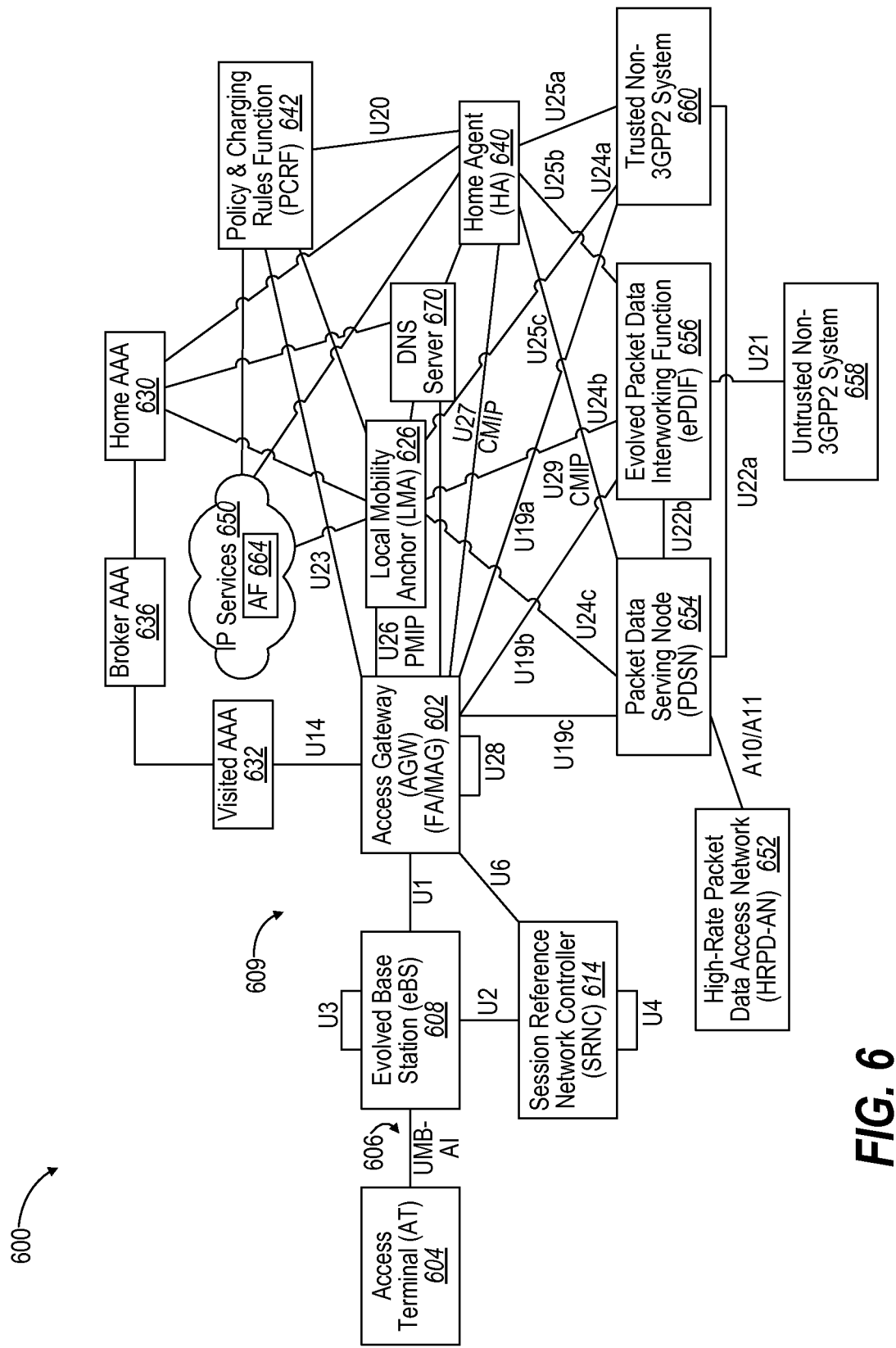
FIG. 6 illustrates a block diagram of an exemplary 3GPP2 Converged Access Network (CAN) having a single Access Gateway (AGW) and without being configured for roaming wireless IP.

In FIG. 6, an exemplary data packet network 600 for DNS update triggered by IPv6 neighbor advertisement is depicted as 3GPP2 Converged Access Network (CAN), which in the illustrative arrangement includes a single Access Gateway (AGW) 602 and without being configured for roaming wireless IP. The AGW 602 serves as a foreign agent/mobile access gateway (FA/MAG). Mobile access gateway (MAG) is a function that manages the mobility related signaling for a mobile node (e.g., access terminal) that is attached to its access link. It is responsible for tracking the mobile node's attachment to the link and for signaling the mobile node's local mobility anchor. The term "MAG" is used with reference to Proxy Mobile IP (PMIP) Version 6. Proxy Mobile IP refers to a protocol based on having the Mobile IP client function in a network element to provide mobility support for an unaltered and mobility-unaware device. AGW 602 is an entity that provides the user's "point of IP connectivity" to the network 600. That is, the AGW 602 is in effect the first-hop router for the mobile node. The AGW 602 performs layer 6 services and above, including hot-lining, accounting, policy enforcement, etc.

An access terminal (AT) 604 is a subscriber device supported by the network 602 and forms an Ultra Mobile Broadband (UMB) Air Interface (AI) 606 with an evolved Base Station (eBS) 608. The eBS 608 is used by the AT 604 for connectivity to a radio access network (RAN) 609. The functions of the eBS 608 can include over-the-air transmission of packets, encryption/decryption of packets at the radio link protocol (RLP) level for over-the-air, transmission/reception, scheduling for over-the-air transmission, policy enforcement for over-the-air transport, and header compression. Additionally, although IP and above services are provided in the AGW 602 or above the AGW 602, the eBS 608 also has visibility to the user's IP packets; at the very least, the eBS 608 has visibility to the outermost header that is sent to the AT 604. With this IP visibility, the eBS 608 can perform optimizations to over-the-air scheduling or other value added functions. In order to perform these optimizations, some policy information can be conveyed from the AGW 602 via to the eBS 608 via a U1 reference point, which carries control and bearer information between eBS 608 and the AGW 602. The U1 reference point includes interfaces for bearer transport (i.e., user data and signaling), Quality of Service (QoS), and accounting. A U3 reference point carries control and bearer information between eBSs 608.

A Session Reference Network Controller (SRNC) 614 is connected to the eBS 608 via an U2 reference point that provides interfaces for carrying control information. The SRNC 614 is also connected to the AGW 602 via a U6 reference point. A U4 reference point carries control information between SRNCs 614. Similarly, a U28 reference point can carry control and bearer information between AGWs 602 and supports fast inter-AGW handoff. The SRNC 614 is responsible for maintaining a session reference with the AT 604. The SRNC 614 is also responsible for supporting idle state management of the AT 604, and providing paging control functions when the AT 604 is idle. The SRNC 614 contains a Session Anchor Access Network Route Instance (ANRI) for each AT 604 that it is supporting.

A Local Mobility Anchor (LMA) 626 is home agent for a mobile node (e.g., AT 604) in the Proxy Mobile IPv6 domain, is the topological anchor point for the mobile node's home prefix, and is the entity that manages the mobile node's reachability state. A U26 reference point carries control and bearer information with PMIP between the LMA 626 and the AGW 602 and supports handoff between AGWs 602.

An "AAA" functional entity provides authentication, authorization, and accounting functions with respect to use by the AT 604 of network resources. In the illustrative depiction, a Home AAA 630 is connected to the LMA 626 and a Visited AAA 632 is connected to the AGW 602 via a U14 reference point. A broker AAA 636 is connected between the Visited AAA 632 and the Home AAA 630.

A Home Agent (HA) 640 is used to provide a mobility solution to the AT 604 in a 3GPP2 packet data network. HA 640 is the topological anchor point for the home network of the AT 604 and is the entity that manages the reach-ability state of the AT 604. The home agent 640 intercepts packets destined to the mobile node's home address, encapsulates them, and tunnels them to the mobile node's registered care-of-address. The home agent 640 may also be used for inter-technology mobility. Depending on the architectural configuration, the HA 640 may include the Local Mobility Agent (LMA) 626. The HA 640 is connected to a Policy and Charging Rules Function (PCRF) 642 via a U20 reference point that allows (QoS) policy and charging information to be conveyed to the HA 640. The PCRF 642 is connected via U27 reference point to the AGW 602 and is connected to the LMA 626.

IP Services 650 comprises any IP based services provided by an operator or third party. This may be part of the Internet or a closed network. The IP services 650 are connected to the PCRF 642, the HA 640, and the LMA 626. A High-Rate Packet Data Access Network (HRPD-AN) 652 is a node in a HRPD legacy packet data network (not shown) connected via a reference point A10/A11 to a Packet Data Serving Node (PDSN) 654. The PDSN 654 is the node that provides the user's point of IP connectivity in the legacy packet data network. An evolved Packet Data Interworking Function (ePDIF) 656 is an interworking function for connectivity between a 3GPP2 network and an untrusted non-3GPP2 network 658 (e.g., WiFI Access Point) via a reference point U21. A trusted Non-3GPP2 System 660, which can be accessed by the AT 604 without an ePDIF, is connected via a reference point U22a to the PDSN 654, via a reference point U25a to the HA 640, via a reference point U24a to the LMA 626, and via a reference point U19a to the AGW 602. The ePDIF 656 is connected via reference point U25b to the HA 640, is connected via reference point U24b to LMA 626, is connected via reference point U19 to AGW 602, and is connected via reference point U22b to the PDSN 654. The PDSN 654 is connected via reference point U25c to the HA 640, is connected via the reference point U24c to the LMA 626, and connected via reference point U19c to the AGW 602.

The AGW 602, LMA 626, HA 640, and PCRF 642 are connected to the IP services network 650, which includes an application function (AF) 664. For policy control, the application function (AF) 664 interacts with the PCRF 642 and the PCRF 642 directly or indirectly interacts with Policy Enforcement Function (PCEF) (not shown) as instructed by the AF 664. The PCEF resides in all bearer nodes (i.e., HA 640, LMA 626, AGW 602, eBS 608) and performs the following functions: authorization of individual IP sessions modification, gate control (i.e. whether there is a common gate handling per AF session or an individual gate handling per AF session component required); and forwarding of IP bearer level events.

A domain name system (DNS) server 670 distributes the responsibility for assigning domain names and mapping them to IP networks by allowing an authoritative server for each domain to keep track of its own changes, avoiding the need for a central registrar to be continually consulted and updated. The DNS 670 is connected to the LMA 626, HAAA 630, HA 640, and AGW 602.

It should be appreciated with the benefit of the present disclosure that techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA is part of Universal Mobile Telecommunication System (UMTS). E-UTRA is part of the 3GPP Long Term Evolution, an upcoming release of 3GPP, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Figure 7:
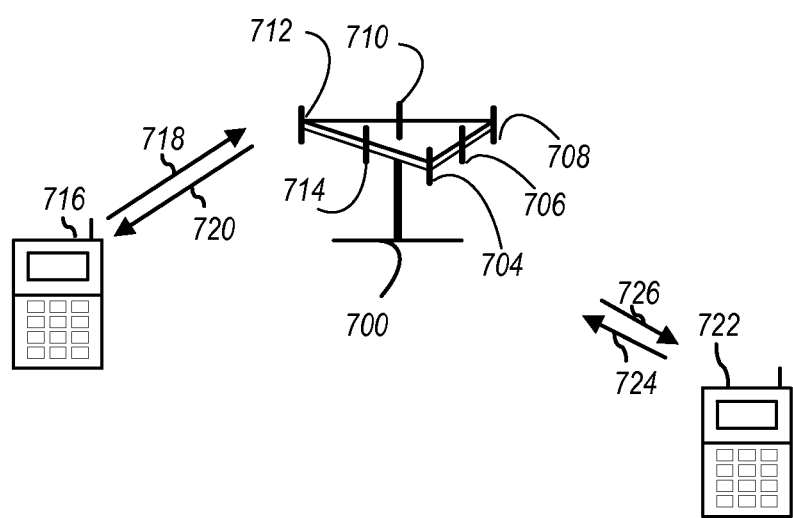
FIG. 7 illustrates a schematic diagram of a multiple access wireless communication system according to one aspect.

Referring to FIG. 7, a multiple access wireless communication system according to one aspect is illustrated. An access point 700 (AP) includes multiple antenna groups, one including 704 and 706, another including 708 and 710, and an additional including 712 and 714. In FIG. 7, only two antennas are shown for each antenna group, however, more or fewer antennas may be utilized for each antenna group. Access terminal 716 (AT) is in communication with antennas 712 and 714, where antennas 712 and 714 transmit information to access terminal 716 over forward link 720 and receive information from access terminal 716 over reverse link 718. Access terminal 722 is in communication with antennas 706 and 708, where antennas 706 and 708 transmit information to access terminal 722 over forward link 726 and receive information from access terminal 722 over reverse link 724. In a FDD system, communication links 718, 720, 724 and 726 may use different frequency for communication. For example, forward link 720 may use a different frequency then that used by reverse link 718.

Each group of antennas and/or the area in which they are designed to communicate is often referred to as a sector of the access point. In the aspect, antenna groups each are designed to communicate to access terminals in a sector of the areas covered by access point 700.

In communication over forward links 720 and 726, the transmitting antennas of access point 700 utilize beam forming in order to improve the signal-to-noise ratio of forward links for the different access terminals 716 and 724. In addition, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 8:
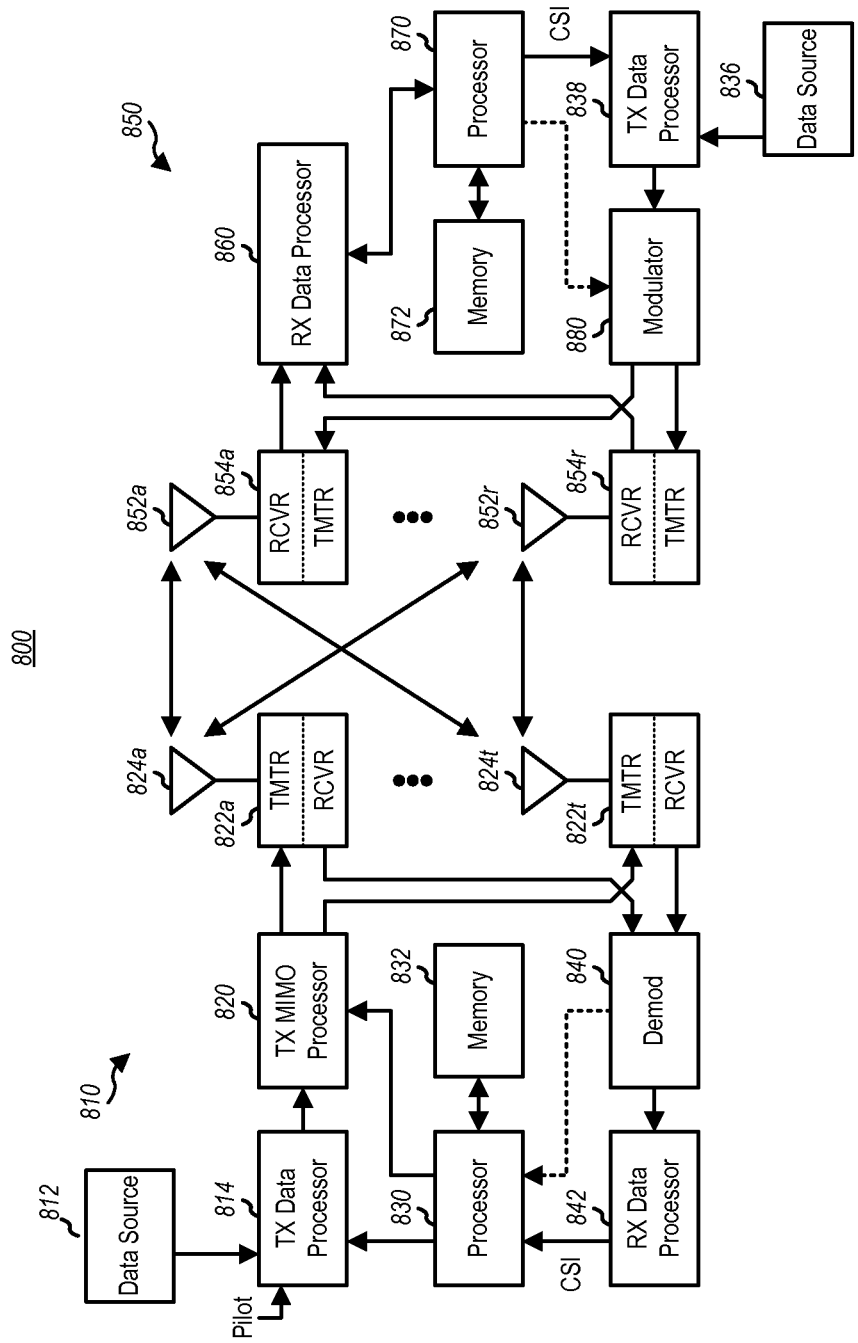
FIG. 8 illustrates a block diagram of a communication system.

FIG. 8 is a block diagram of an aspect of a transmitter system 810 (also known as the access point) and a receiver system 850 (also known as access terminal) in a MIMO system 800. At the transmitter system 810, traffic data for a number of data streams is provided from a data source 812 to a transmitter (TX) data processor 814.

In an aspect, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for all data streams are then provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In certain implementations, TX MIMO processor 820 applies beam-forming weights to the symbols of the data streams and to the antenna from which the symbol is being transmitted.

Each transmitter 822 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and down converts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use (discussed below). Processor 870 formulates a reverse link message comprising a matrix index portion and a rank value portion.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Processor 830 then determines which pre-coding matrix to use for determining the beam forming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS)

scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

The invention claimed is:

1. A method for performing a dynamic name system (DNS) update on a data packet network, comprising:
    receiving a router solicitation from an access terminal (AT) for performing a stateless address autoconfiguration;
    sending, from an access gateway to the AT in response to the router solicitation:
        a router advertisement including an Internet Protocol version 6 (IPv6) prefix, and
        a neighbor solicitation following the router advertisement to elicit a neighbor advertisement for an address of the AT;
    receiving, from the AT, the neighbor advertisement comprising the address of the AT, wherein the address of the AT is based at least in part on the neighbor solicitation, and includes at least a portion of an IPv6 address based on the IPv6 prefix; and
    initiating a network action to cause a DNS update based on the address of the AT.

2. The method of claim 1, wherein the initiating the network action to cause the DNS update includes forming a security association with a DNS server responsible for performing the DNS update, and transmitting a DNS update message to the DNS server using the security association.

3. The method of claim 2, further comprising transmitting the DNS update message from a home agent.

4. The method of claim 2, further comprising transmitting the DNS update message from the access gateway.

5. The method of claim 1, wherein the initiating the network action to cause the DNS update includes transmitting an accounting request/start message to an authentication, authorization, and accounting (AAA) function.

6. The method of claim 5, further comprising transmitting the account request/start message from a home agent.

7. The method of claim 5, further comprising transmitting the account request/start message from the access gateway.

8. The method of claim 5, further comprising transmitting the account request/start message to a visited AAA function for providing to a home AAA function.

9. The method of claim 8, wherein the accounting request/start message comprises a DNS update request.

10. The method of claim 9, wherein the DNS update request is within a RADIUS attribute or a Diameter AVP of the accounting request/start message.

11. At least one processor for performing a dynamic name system (DNS) update on a data packet network, comprising:
    a first processor module configured to receive a router solicitation from an access terminal (AT) for performing a stateless address autoconfiguration;
    a second processor module, comprising hardware, configured to send, from an access gateway to the AT in response to the router solicitation:
        a router advertisement including an Internet Protocol version 6 (IPv6) prefix, and
        a neighbor solicitation following the router advertisement to elicit a neighbor advertisement for an address of the AT;
    a third processor module configured to receive, from the AT, the neighbor advertisement comprising the address of the AT, wherein the address of the AT is based at least in part on the neighbor solicitation and includes at least a portion of an IPv6 address based on the IPv6 prefix; and
    a fourth processor module configured to initiate a network action to cause a DNS update based on the address of the AT.

12. The at least one processor of claim 11, wherein the fourth module is further configured to initiate the network action to cause the DNS update at least in part by:
    forming a security association with a DNS server responsible for performing the DNS update, and
    transmitting a DNS update message to the DNS server using the security association.

13. A non-transitory computer-readable medium storing computer executable code for performing a dynamic name system (DNS) update on a data packet network, comprising:
    code for receiving a router solicitation from an access terminal (AT) for performing a stateless address autoconfiguration;
    code for sending, from an access gateway to the AT in response to the router solicitation:
        a router advertisement including an Internet Protocol version 6 (IPv6) prefix, and
        a neighbor solicitation following the router advertisement to elicit a neighbor advertisement for an address of the AT;
    code for receiving, from the AT, a neighbor advertisement comprising the address of the AT, wherein the address of the AT is based at least in part on the neighbor solicitation and includes at least a portion of an IPv6 address based on the IPv6 prefix; and
    code for initiating a network action to cause a DNS update based on the address of the AT.

14. The non-transitory computer-readable medium of claim 13, wherein the code for initiating further comprises:
    code for forming a security association with a DNS server responsible for performing the DNS update, and
    code for transmitting a DNS update message to the DNS server using the security association.

15. The non-transitory computer-readable medium of claim 13, wherein the code for initiating further comprises:
    code for transmitting an accounting request/start message to an authentication, authorization, and accounting (AAA) function.

16. An apparatus for performing a dynamic name system (DNS) update on a data packet network, comprising:
    means for receiving a router solicitation from an access terminal (AT) for performing a stateless address autoconfiguration;
    means for sending, from an access gateway to the AT in response to the router solicitation:
        a router advertisement including an Internet Protocol version 6 (IPv6) prefix, and a neighbor solicitation following the router advertisement to elicit a neighbor advertisement for an address of the AT;

means for receiving, from the AT, a neighbor advertisement comprising the address of the AT, wherein the address of the AT is based at least in part on the neighbor solicitation and includes at least a portion of an IPv6 address based on the IPv6 prefix; and means for initiating a network action to cause a DNS update based on the address of the AT.

17. The apparatus of claim 16, wherein the means for initiating the network action further comprises:

means for forming a security association with a DNS server responsible for performing the DNS update, and means for transmitting a DNS update message to the DNS server using the security association.

18. The apparatus of claim 16, wherein the means for initiating the network action further comprises:

means for transmitting an accounting request/start message to an authentication, authorization, and accounting (AAA) function.

19. An apparatus for performing a dynamic name system (DNS) update on a data packet network, comprising:

a data packet communication network configured to receive a router solicitation from an access terminal (AT) for performing a stateless address autoconfiguration;

an access gateway (AGW) configured to:
  send to the AT in response to the router solicitation:
    a router advertisement including an Internet Protocol version 6 (IPv6) prefix, and
    a neighbor solicitation following the router advertisement to elicit a neighbor advertisement for an address of the AT in response to the router solicitation and for
  receive, from the AT, the neighbor advertisement comprising the address of the AT, wherein the address of the AT is based at least in part on the neighbor solicitation and includes at least a portion of an IPv6 address based on the IPv6 prefix; and a network entity associated with the AGW configured to initiate a network action to cause a DNS update based on the address of the AT.

20. The apparatus of claim 19, wherein the network entity is further configured to:
form a security association with a DNS server; and
transmit a DNS update message to the DNS server using the security association.

21. The apparatus of claim 20, wherein the network entity comprises a home agent.

22. The apparatus of claim 20, wherein the network entity comprises the access gateway.

23. The apparatus of claim 19, wherein the network entity is further configured to initiate the network action to cause the DNS update by transmitting an accounting request/start message to an authentication, authorization, and accounting (AAA) function.

24. The apparatus of claim 23, wherein the network entity comprises a home agent.

25. The apparatus of claim 23, wherein the network entity comprises the access gateway.

26. The apparatus of claim 23, wherein the AAA function is further configured to transmit the account request/start message to a visited AAA function for providing the account request/start message to a home AAA function.

27. The apparatus of claim 26, wherein the accounting request/start message comprises a DNS update request.

28. The apparatus of claim 27, wherein the DNS update request is within a RADIUS attribute or a Diameter AVP of the accounting request/start message.

29. A method for performing a dynamic name system (DNS) update on a data packet network, comprising:

sending, from an access terminal (AT) to an access gateway (AGW), a router solicitation for performing a stateless address autoconfiguration;

receiving, by the AT from the AGW in response to the router solicitation:
  a router advertisement including an Internet Protocol version 6 (IPv6) prefix, and
  a neighbor solicitation following the router advertisement to elicit a neighbor advertisement for an address of the AT;

performing the stateless address autoconfiguration using the IPv6 prefix; and sending, by the AT to the AGW, the neighbor advertisement comprising the address of the AT to cause a DNS update, wherein the address of the AT is based at least in part on the neighbor solicitation and includes at least a portion of an IPv6 address based on the IPv6 prefix.

30. The method of claim 29, wherein the performing the stateless address autoconfiguration includes creating the address including the IPv6 prefix and an interface identifier.

31. At least one processor for performing a dynamic name system (DNS) update on a data packet network, comprising:

a first processor module configured to send a router solicitation for performing a stateless address autoconfiguration from an access terminal (AT) to an access gateway (AGW);

a second processor module configured to receive, from the AGW in response to the router solicitation:
  a router advertisement including an Internet Protocol version 6 (IPv6) prefix, and
  a neighbor solicitation following the router advertisement to elicit a neighbor advertisement for an address of the AT;

a third processor module, comprising hardware, configured to perform the stateless address autoconfiguration using the IPv6 prefix; and a fourth processor module configured to send, from the AT to the AGW, the neighbor advertisement comprising the address of the AT to cause a DNS update, wherein the address of the AT is based at least in part on the neighbor solicitation and includes at least a portion of an IPv6 address based on the IPv6 prefix.

32. The at least one processor of claim 31, wherein the third processor module is further configured to perform the stateless address autoconfiguration at least in part by creating the address including the IPv6 prefix and an interface identifier.

33. A non-transitory computer-readable medium storing computer executable code for performing a dynamic name system (DNS) update on a data packet network, comprising:

code for sending, from an access terminal (AT) to an access gateway (AGW), a router solicitation for performing a stateless address autoconfiguration;

code for receiving, by the AT from the AGW in response to the router solicitation:
  a router advertisement including an Internet Protocol version 6 (IPv6) prefix, and
  a neighbor solicitation following the router advertisement to elicit a neighbor advertisement for an address of the AT;

code for performing the stateless address autoconfiguration using the IPv6 prefix;

code for sending, by the AT to the AGW, the neighbor advertisement comprising the address of the AT, to cause a DNS update, wherein the address of the AT is based at least in part on the neighbor solicitation and includes at least a portion of an IPv6 address based on the IPv6 prefix.

34. The non-transitory computer-readable medium of claim 33, wherein the code for performing the stateless address autoconfiguration further comprises:
code for creating the address including the IPv6 prefix and an interface identifier.

35. An apparatus for performing a dynamic name system (DNS) update on a data packet network, comprising:
means for sending, from an access terminal (AT) to an access gateway (AGW), a router solicitation for performing a stateless address autoconfiguration;
means for receiving, by the AT from the AGW in response to the router solicitation:
  a router advertisement including an Internet Protocol version 6 (IPv6) prefix, and
  a neighbor solicitation following the router advertisement to elicit a neighbor advertisement for an address of the AT;
means for performing the stateless address autoconfiguration using the IPv6 prefix; and
means for sending, by the AT to the AGW, the neighbor advertisement comprising the address of the AT to cause a DNS update, wherein the address of the AT is based at least in part on the neighbor solicitation and includes at least a portion of an IPv6 address based on the IPv6 prefix.

36. The apparatus of claim 35, wherein the means for performing the stateless address autoconfiguration further comprises:
means for creating the address based at least in part on the IPv6 prefix and an interface identifier.

37. An apparatus for performing a dynamic name system (DNS) update on a data packet network, comprising:
a transmitter component configured to send a router solicitation for performing a stateless address autoconfiguration from an access terminal (AT) to an access gateway (AGW);
a receiver component configured to receive, from the AGW in response to the router solicitation,
  a router advertisement including an Internet Protocol version 6 (IPv6) prefix, and
  a neighbor solicitation following the router advertisement to elicit a neighbor advertisement for an address of the AT;
an address autoconfiguration component configured to:
  perform the stateless address autoconfiguration using the IPv6 prefix, and
  cause the transmitter component to send, from the AT to the AGW, the neighbor advertisement comprising the address of the AT to cause a DNS update, wherein the address of the AT is based at least in part on the neighbor solicitation and includes at least a portion of an IPv6 address based on the IPv6 prefix.

38. The apparatus of claim 37, wherein the address autoconfiguration component is further configured to create the address including the IPv6 prefix and an interface identifier based at least in part on performing the stateless address autoconfiguration.

* * * * *